A. COOKE.
Velocipedes.

No. 153,423. Patented July 28, 1874.

Attest.

Inventor.

Augustus Cooke

UNITED STATES PATENT OFFICE.

AUGUSTUS COOKE, OF CINCINNATI, OHIO, ASSIGNOR OF ONE-HALF HIS RIGHT TO LEWIS C. HOPKINS, OF SAME PLACE.

IMPROVEMENT IN VELOCIPEDES.

Specification forming part of Letters Patent No. 153,423, dated July 28, 1874; application filed April 24, 1874.

*To all whom it may concern:*

Be it known that I, AUGUSTUS COOKE, of Cincinnati, in the county of Hamilton and State of Ohio, have invented an Improvement in Pleasure-Vehicles, of which the following is a specification:

My invention relates to pleasure-vehicles which are driven by the persons riding in them by means of a seat adjusted upon rockers; and consists in an improved mode of adjusting said rockers for said purpose.

Figure 1:
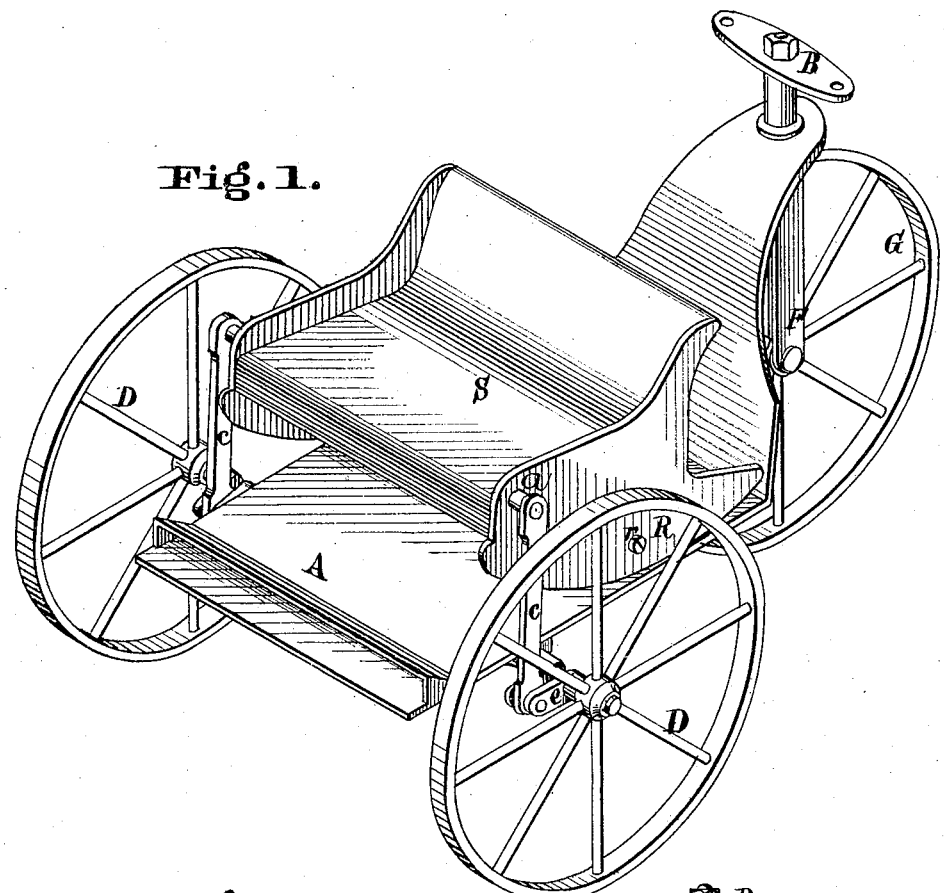
Figure 2:
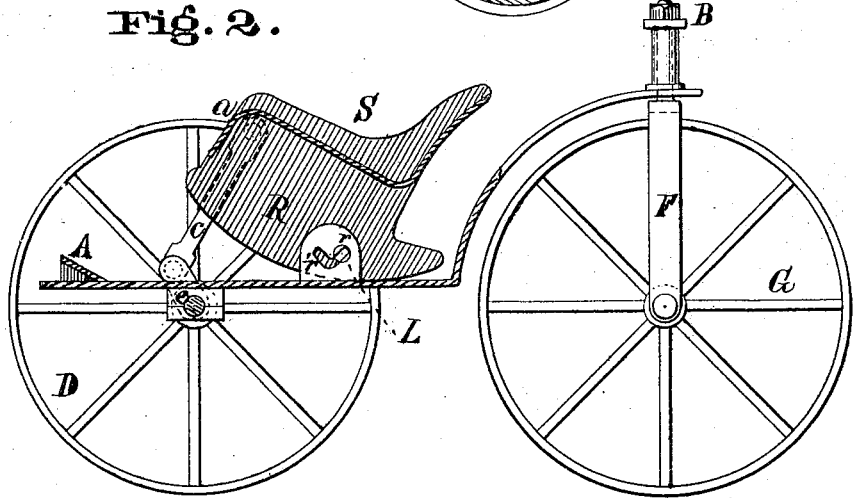

Figure 1 is an elevation, in perspective, of a vehicle containing my invention. Fig. 2 is a sectional elevation taken longitudinally through the middle of the vehicle.

In the drawings, S is the seat, which may be made of wood or metal, and in the present application is made of a width sufficient for two persons to comfortably sit in. The seat is provided with two rockers, R R, which may be of any desired construction, but should be attached firmly to the seat, and which have a bolt, $r$, securely attached thereto, and playing in the slot $r'$ (which should be in the form of a cycloid) in the lugs L, which are firmly secured to the bottom of the vehicle. To the arms of the seat, at $a$, on either side, are attached the connecting-rods $c$ $c$, which connect with the cranks $e$ $e$, connected with the shaft, to which the driving-wheels are rigidly attached.

As a modification, the arms of the seat may project over the driving-wheels and connecting-rods secured to the spokes of the wheels a short distance from the hub.

A is a foot-rest secured to the bottom of the vehicle, against which the person operating the vehicle may push in order to get purchase. The guide-wheel G is placed in the rear, and is turned by means of the shaft F and arm B, to which tiller-ropes are attached.

The operator or operators sit in the seat S, and start the vehicle by moving the driving-wheels D, applying the hand to their peripheries. When the vehicle is in motion, by rocking the seat, power is communicated to the driving-wheels through the connecting-rods $c$ $c$ and cranks $e$ $e$, the whole being guided by the wheel G. Applying the power directly prevents loss by friction, and the width of the seat enables two or more persons to operate the vehicle. This vibrating or rocking seat may be applied to a railway-car, if desired, as a means of propulsion.

What I claim in the present application is—

The combination of seat S and rockers R with lugs L, having slots $r'$, as and for the purposes described.

AUGUSTUS COOKE.

Witnesses:
    JOHN E. HATCH,
    ROBT. H. PARKINSON.